(12) United States Patent  (10) Patent No.: US 8,922,174 B2
Xu  (45) Date of Patent: Dec. 30, 2014

(54) POWER FACTOR CORRECTION CIRCUIT WITH FREQUENCY JITTERING

(75) Inventor: Xiaoru Xu, Hangzhou (CN)

(73) Assignee: Silergy Semiconductor Technology (Hangzhou) Ltd, Hangzhou (CN)

( * ) Notice: Subject to any disclaimer, the term of this patent is extended or adjusted under 35 U.S.C. 154(b) by 386 days.

(21) Appl. No.: 13/447,998

(22) Filed: Apr. 16, 2012

(65) Prior Publication Data

US 2012/0281448 A1    Nov. 8, 2012

(30) Foreign Application Priority Data

May 3, 2011    (CN) .......................... 2011 1 0112696

(51) Int. Cl.
    *H02M 1/42*    (2007.01)
(52) U.S. Cl.
    CPC ............ *H02M 1/4225* (2013.01); *Y02B 70/126* (2013.01)
    USPC .......................................... 323/207; 323/288
(58) Field of Classification Search
    CPC ............ H02M 1/4208; H02M 1/4225; H02M 1/4233; H02M 1/44
    USPC ......... 323/205–211, 271–275, 282–285, 288, 323/351; 327/131–140
    See application file for complete search history.

(56) References Cited

U.S. PATENT DOCUMENTS

| | | | |
|---|---|---|---|
| 5,592,128 A * | 1/1997 | Hwang | 331/61 |
| 7,012,413 B1 * | 3/2006 | Ye | 323/284 |
| 7,123,494 B2 * | 10/2006 | Turchi | 363/89 |
| 7,466,110 B2 * | 12/2008 | Tsuruya | 323/207 |

* cited by examiner

*Primary Examiner* — Jessica Han
*Assistant Examiner* — Ivan Laboy Andino
(74) *Attorney, Agent, or Firm* — Michael C. Stephens, Jr.

(57) ABSTRACT

The present invention relates to a power factor correction circuit, that can include: an inductor current detector that generates a sampling voltage signal, and sinusoidal half-wave current and voltage signals based on the sampling voltage signal; a mediate signal generator generating slope voltage and clock signals in response to the sinusoidal half-wave voltage signal, where a frequency of each varies with the sinusoidal half-wave voltage signal; a current modulation circuit receiving the sinusoidal half-wave current signal and a voltage feedback signal representative of a power stage output voltage to generate a regulation signal that is compared against the slope voltage signal to generate a modulation signal; and a logic/driving circuit receiving the modulation and clock signals, and generating a controlling signal that controls a power switch with variable frequency to maintain the inductor current in phase with the sinusoidal half-wave voltage signal and the power stage output voltage constant.

11 Claims, 10 Drawing Sheets

FIG. 1 (conventional)

POWER FACTOR CORRECTION CIRCUIT WITH FREQUENCY JITTERING

RELATED APPLICATIONS

This application claims the benefit of Chinese Patent Application No. CN201110112696.3, filed on May 3, 2011, which is incorporated herein by reference in its entirety.

FIELD OF THE INVENTION

The present invention generally pertains to power supply systems, and more specifically relates to a power factor correction circuit with jittering frequency.

BACKGROUND

Figure 1:
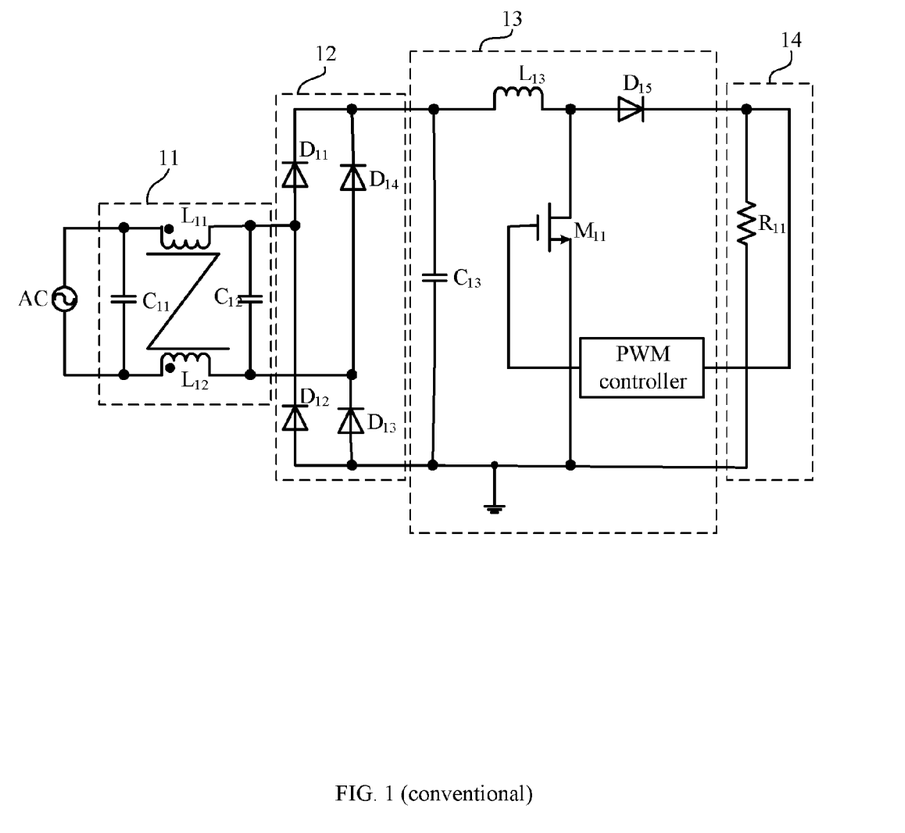
FIG. 1 is a schematic block diagram of an example conventional AC/DC power supply.

A conventional AC/DC power supply may include an electromagnetic interference (EMI) filter, a rectifier, a power factor correction circuit, and a power stage. With reference to FIG. 1, a schematic diagram of a conventional AC/DC power supply is shown. In this example, an AC supply is filtered by EMI filter 11 to eliminate electromagnetic interference, and then rectified by full-bridge rectifier 12. An output voltage of full-bridge rectifier 12 may be corrected by power factor correction circuit 13, and then sent to drive load 14 during normal operation. However, the drawbacks of this approach include increased printed circuit board (PCB) size and cost due to use of the EMI filter arranged in front of the full-bridge rectifier.

SUMMARY

In one embodiment, a power factor correction circuit can include: (i) an inductor current detection circuit to detect inductor current flowing through an inductor to generate a sampling voltage signal, and to generate a sinusoidal half-wave current signal and a sinusoidal half-wave voltage signal based on the sampling voltage signal; (ii) a mediate signal generator to generate a slope voltage signal and a clock signal in response to the sinusoidal half-wave voltage signal, where a frequency of each of the slope voltage signal and the clock signal varies with the sinusoidal half-wave voltage signal; (iii) a current modulation circuit to receive the sinusoidal half-wave current signal and a voltage feedback signal representative of an output voltage of a power stage to generate a regulation signal, where the regulation signal may be compared against the slope voltage signal to generate a modulation signal; and (iv) a logic and driving circuit to receive the modulation signal and the clock signal, and to generate a controlling signal therefrom, where the controlling signal can control a power switch to operate with variable frequency to maintain the inductor current substantially in phase with the sinusoidal half-wave voltage signal and the output voltage of the power stage constant.

In addition, an AC/DC power supply can include the power factor correction circuit, a rectifier, and the power stage. The rectifier circuit can be configured to generate a rectifier sinusoidal half-wave voltage in response to a received AC voltage. The power stage can include the inductor, the power switch, a rectifier switch, and an output filtering circuit. The power stage can receive the rectifier sinusoidal half-wave voltage, and generate the output voltage.

Embodiments of the present invention can advantageously provide several advantages over conventional approaches. For example, particular embodiments can provide a power factor correction circuit with improved anti-electromagnetic interference by employing a frequency jittering technique to reduce cost and facilitate integration and miniaturization of the power supply. Other advantages of the present invention will become readily apparent from the detailed description of preferred embodiments below.

DETAILED DESCRIPTION

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Electromagnetic interference (EMI) may be reduced by use of a frequency jittering technique. For example, such a frequency jittering technique can be implemented by a floating switching frequency within a fixed range to disperse harmonic interference energy to meet EMI power supply requirements. However, if an independent specialized chip is used to generate the variable frequency, this approach may result in higher costs and less integration and miniaturization benefits.

Embodiments of the present invention can advantageously provide several advantages over conventional approaches. Particular embodiments may provide a power factor correction circuit with improved anti-electromagnetic interference by employing a frequency jittering technique to reduce cost, and also to facilitate integration and miniaturization of the power supply. The invention, in its various aspects, will be explained in greater detail below with regard to exemplary embodiments.

In particular embodiments, a clock signal with variable frequency may be generated by a mediate signal generator to obtain a variable frequency controlling signal that can be used to control a power switch in a working operation with variable frequency. In this way, by a frequency jittering technique, the operating frequency of an/power supply can be varied. The operating waveform of inductor current may be in phase with a waveform of a sinusoidal half-wave voltage to achieve the power factor correction by current modulation circuit, and the output voltage may be maintained substantially constant. Both the mediate signal generator and the current modulation circuit may be integrated (e.g., on a same monolithic integrated circuit) with the power factor correction circuit. As a result, integration and miniaturization for an AC/DC power supply may be facilitated and effective, electromagnetic interference can be substantially eliminated, and cost may be decreased.

Figure 2:
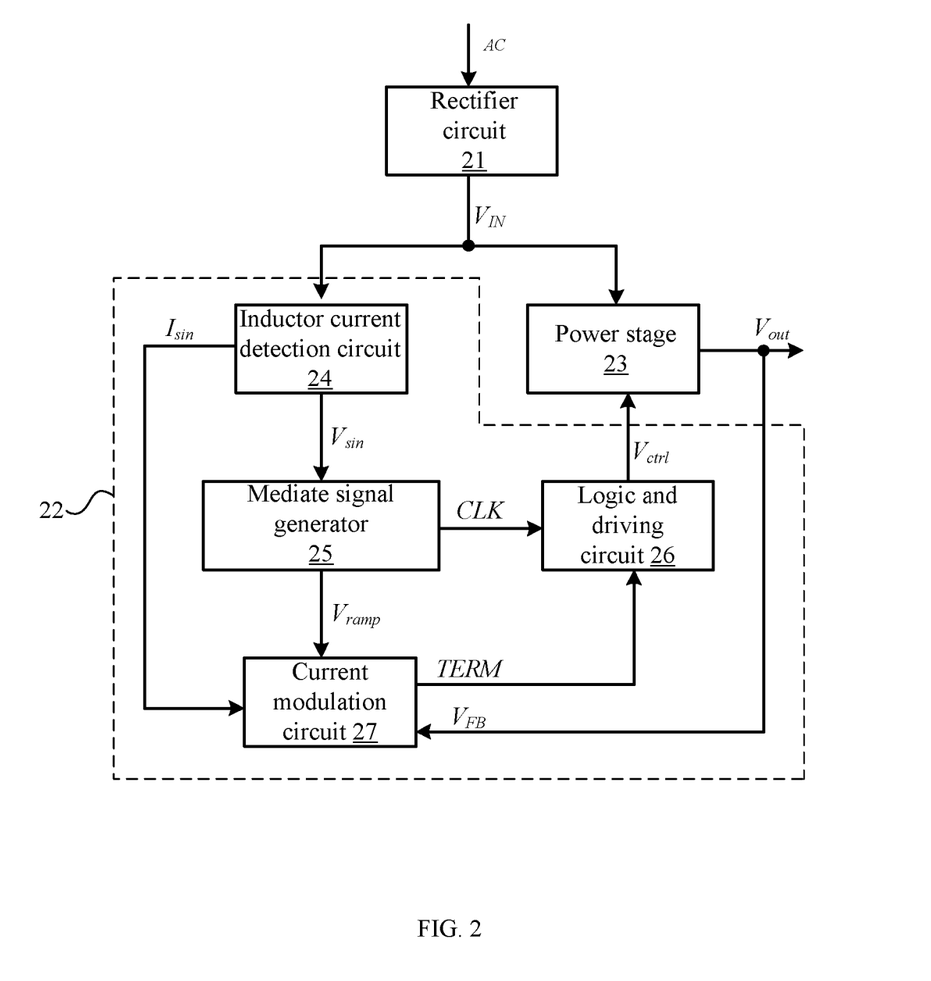
FIG. 2 is a schematic block diagram illustrating an example power factor correction circuit in accordance with embodiments of the present invention.

A schematic diagram of an example power factor correction circuit employed in an AC/DC power supply structure, in accordance with embodiments of the present invention, is shown in FIG. 2. The particular example circuit of FIG. 2 can include rectifier circuit 21, power factor correction circuit 22, and power stage 23.

Power factor correction circuit 22 can include inductor current detection circuit 24, which can generate sinusoidal half-wave current signal $I_{sin}$ and sinusoidal half-wave voltage signal $V_{sin}$ based on the inductor current $I_L$ flowing through the inductor of power stage 23. Mediate signal generator 25 can generate slope voltage signal $V_{ramp}$ and clock signal CLK, both of which may have a frequency varied with the sinusoidal half-wave voltage $V_{sin}$. Current modulation circuit 27 can receive the sinusoidal half-wave current signal $I_{sin}$, voltage feedback signal $V_{FB}$ representative of the output voltage of power stage 23, and slope voltage signal $V_{ramp}$, to generate modulation signal TERM.

Logic and driving circuit 26 can generate controlling signal $V_{ctrl}$, the frequency of which may be variable in accordance with the modulation signal TERM and clock signal CLK, with variable frequency to control the power switch of power stage 23 in an operation with such variable frequency such that the inductor current is in phase with the sinusoidal half-wave voltage $V_{sin}$, and output voltage $V_{out}$ is maintained at a substantially constant level.

Figure 3:
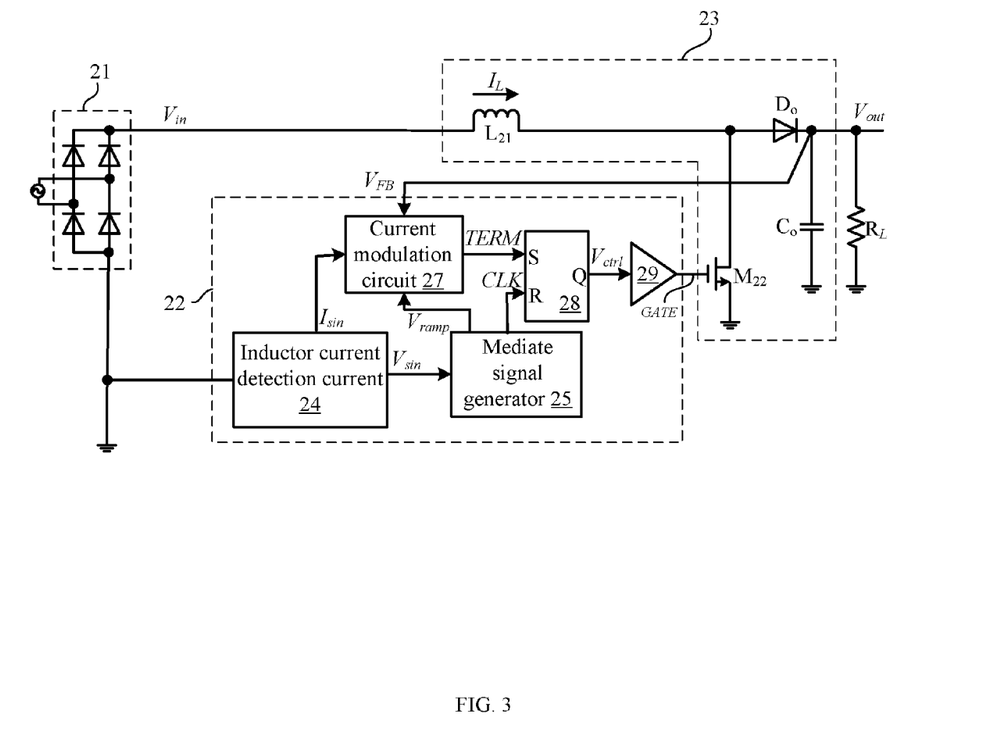
FIG. 3 is a schematic block diagram of an example power factor correction circuit employed in a boost power stage in accordance with embodiments of the present invention.
Figure 4:
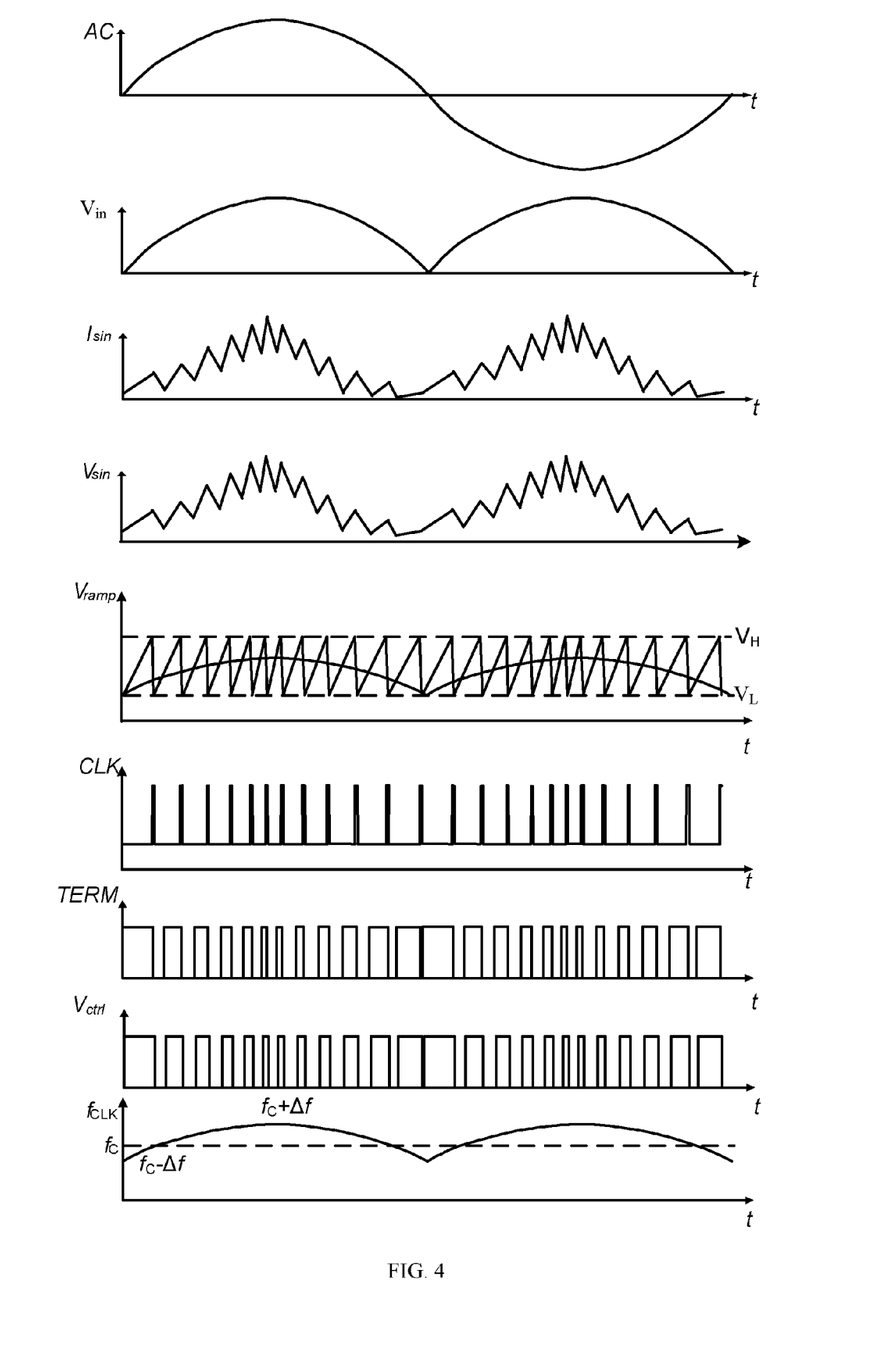
FIG. 4 is a waveform diagram showing an example operation of the power factor correction circuit in a boost power stage of FIG. 3, in accordance with embodiments of the present invention.
Figure 5:
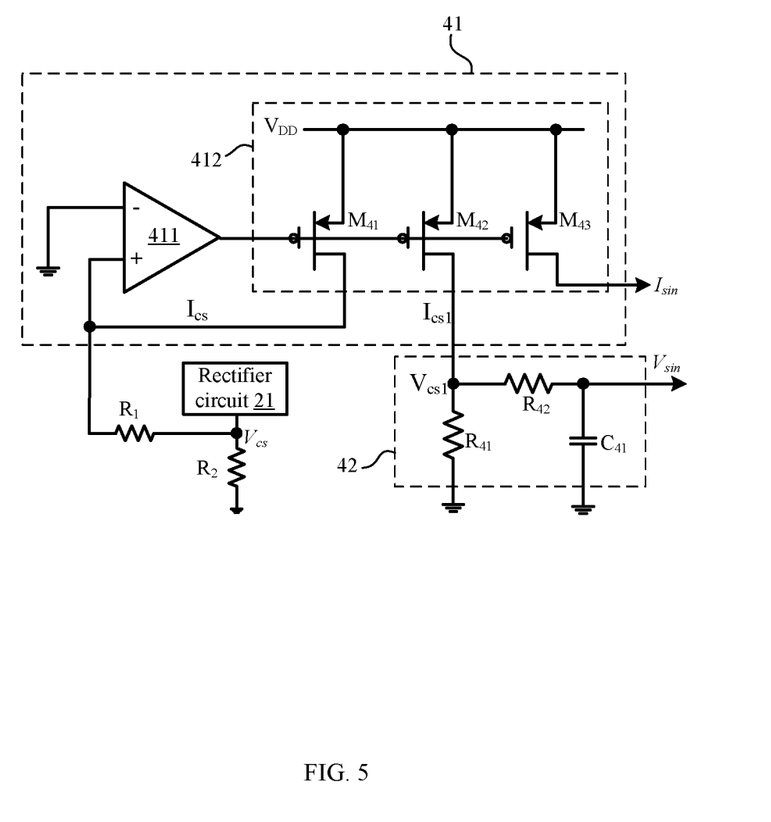
FIG. 5 is a schematic diagram of an example inductor current detection circuit in accordance with embodiments of the present invention.

The power factor correction circuit in accordance with embodiments of the present invention will be described in detail with reference to the following diagrams. In conjunction with FIGS. 3 and 4, a power factor correction circuit configured for use by a boost AC/DC power supply will be described. FIG. 3 shows a schematic block diagram of an example AC/DC power supply employing a boost power stage, and FIG. 4 shows an example operational waveform of the power factor correction circuit of the AC/DC power supply in FIG. 3. Also, FIG. 5 shows a block schematic diagram of an example current modulation circuit 27 of FIG. 3.

With reference to FIGS. 3 and 4, example operation of the AC/DC power supply is as follows. Sinusoidal input voltage $V_{in}$ may be generated by rectifier circuit 21 based on the external sinusoidal voltage AC. Inductor current $I_L$ flowing through inductor $L_{21}$ represented as a saw-tooth waveform may be controlled by the switching operation of power switch $M_{22}$, as shown in FIG. 4.

When power switch $M_{22}$ is turned on, inductor $L_{21}$, power switch $M_{22}$ and rectifier circuit 21 (bridge rectifier) may form a conduction loop, and inductor current $I_L$ can increase to place inductor $L_{21}$ in an energy storing condition. When power switch $M_{22}$ is turned off, inductor $L_{21}$, output diode $D_o$, capacitor $C_o$, an equivalent resistor of load $R_L$ and rectifier circuit 21 (bridge rectifier) may form another conduction loop, and inductor $L_{21}$ may operate in a discharging condition.

When the resistance of equivalent resistor of load $R_L$ is increasing, current flowing through the equivalent resistor of load $R_L$ can correspondingly increase, while current flowing through capacitor $C_o$ may be decreasing, leading to a decrease of output voltage $V_{out}$. However, when the resistance of equivalent resistor of load $R_L$ is decreasing, current flowing through equivalent resistor of load $R_L$ may correspondingly decrease, while current flowing through capacitor $C_o$ can increase, leading to an increase of output voltage $V_{out}$.

Example operation of power factor correction circuit 22 is as follows. Inductor current $I_L$ flowing through inductor $L_{21}$ may be sensed by inductor current detection circuit 24 to output sinusoidal half-wave current signal $I_{sin}$ and sinusoidal half-wave voltage signal $V_{sin}$. Then, sinusoidal half-wave voltage signal $V_{sin}$ may be transferred to mediate signal generator 25 to generate slope voltage signal $V_{ramp}$ and clock signal CLK, the frequency of both of which may be varied with the sinusoidal half-wave voltage signal $V_{sin}$.

Current modulation circuit 27 can receive the sinusoidal half-wave current signal $I_{sin}$, and the voltage feedback signal $V_{FB}$ indicating the output voltage of power stage 23 and the slope voltage signal $V_{ramp}$, to generate modulation signal TERM. Second trigger 28 may be configured as an RS flip-flop, and buffering circuit 29 can include the logic and driving circuit. The set terminal of second trigger 28 can receive modulation signal TERM, and the reset terminal can receive clock signal CLK to generate controlling signal $V_{ctrl}$, which can be used to control operation of power switch M22 through buffering circuit 29.

The switching frequency of power switch $M_{22}$ may vary with controlling signal $V_{ctrl}$ to achieve the variable frequency of the AC/DC power supply by the frequency jittering technique, to decrease electromagnetic interference. In addition, inductor current $I_L$ (input current of the power factor correction circuit) may be in phase with the sinusoidal input voltage (rectified input voltage) $V_{in}$ to achieve power factor correction by current modulation circuit 27.

With reference to FIG. 5, shown is a schematic block diagram of an example inductor current detection circuit 24 in accordance with embodiments of the present invention. Inductor current detection circuit 24 can include sinusoidal half-wave current signal generator 41 and sinusoidal half-wave voltage signal generator 42. Here, sinusoidal half-wave current signal generator 41 can include resistor $R_2$, first differential amplifier 411, and first current mirror circuit 412. Resistor $R_2$ may be coupled between rectifier circuit 21 and ground to sense the inductor current, and to generate a sampling voltage signal $V_{cs}$ at the first terminal of resistor $R_2$. The inverting terminal of first differential amplifier 411 may be coupled to ground, and the non-inverting terminal can be coupled to receive sampling voltage signal $V_{cs}$ through resistor $R_1$, to generate first differential amplifying signal.

First current mirror circuit 412 can include first transistor $M_{41}$, second transistor $M_{42}$, and third transistor $M_{43}$, that may be coupled as a cascade current mirror ("cascade mode"), where the gates of these transistors may be coupled to the first differential amplifying signal. Here, a drain of first transistor $M_{41}$ can be coupled to the non-inverting input terminal of first differential amplifier 411 to generate a drain current $I_{cs}$. The value of drain current $I_{cs}$ can be calculated as in Equation 1, in accordance with the "virtual open" characteristic of amplifier.

$$I_{cs} = \frac{I_L \cdot R_2}{R_1} \cdot V_{cs} \qquad (1)$$

By current mirroring of second transistor M42, mirror current $I_{cs1}$ may be generated at the drain terminal of second transistor M42, and the drain current of third transistor M43 can be used as sinusoidal half-wave current signal $I_{sin}$. The proportional coefficient of first transistor $M_{41}$, second transistor $M_{42}$, and third transistor $M_{43}$ maybe $K_1:K_2:K_3$, which can be selected to satisfy the common mode range of a following comparator, such as comparator 511 of mediate signal generator 25.

Sinusoidal half-wave voltage signal $V_{sin}$ generator 42 can include resistor $R_{42}$, resistor $R_{41}$, and first capacitor $C_{41}$. Drain current (mirror current $I_{cs1}$) of second transistor M42 may flow through resistor $R_{41}$, which can be coupled between the drain of second transistor $M_{42}$ and ground, to generate sensing voltage $V_{cs1}$ at a common node of resistor $R_{41}$ and the drain of second transistor $M_{42}$. Sensing voltage $V_{cs1}$ may be filtered by resistor R42 and capacitor C41 coupled in series between a common node of both resistor $R_{41}$ and the drain of second transistor $M_{42}$ and ground. A voltage of the common node of resistor R42 and capacitor C41 may be used as sinusoidal half-wave voltage signal $V_{sin}$.

Figure 6:
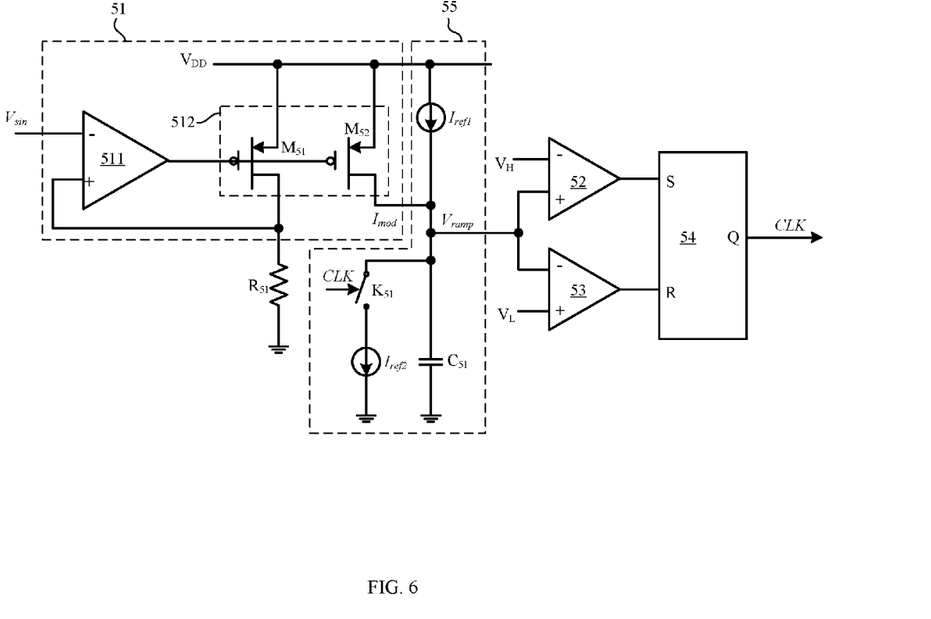
FIG. 6 is a schematic block diagram of a first example mediate signal generator in accordance with embodiments of the present invention.

Referring now to FIG. 6, shown is a schematic block diagram of an example mediate signal generator 25, in accordance with embodiments of the present invention. This particular example mediate signal generator can include second voltage-current converting circuit 51 used to convert sinusoidal half-wave voltage signal $V_{sin}$ to modulation current signal $I_{mod}$. Slope voltage signal generator 55 can be used to generate slope voltage signal $V_{ramp}$ with variable frequency based on modulation current signal $I_{mod}$. First comparator 52 may be used to compare slope voltage signal $V_{ramp}$ against upper limit voltage reference $V_H$ to generate a set signal.

Figure 7:
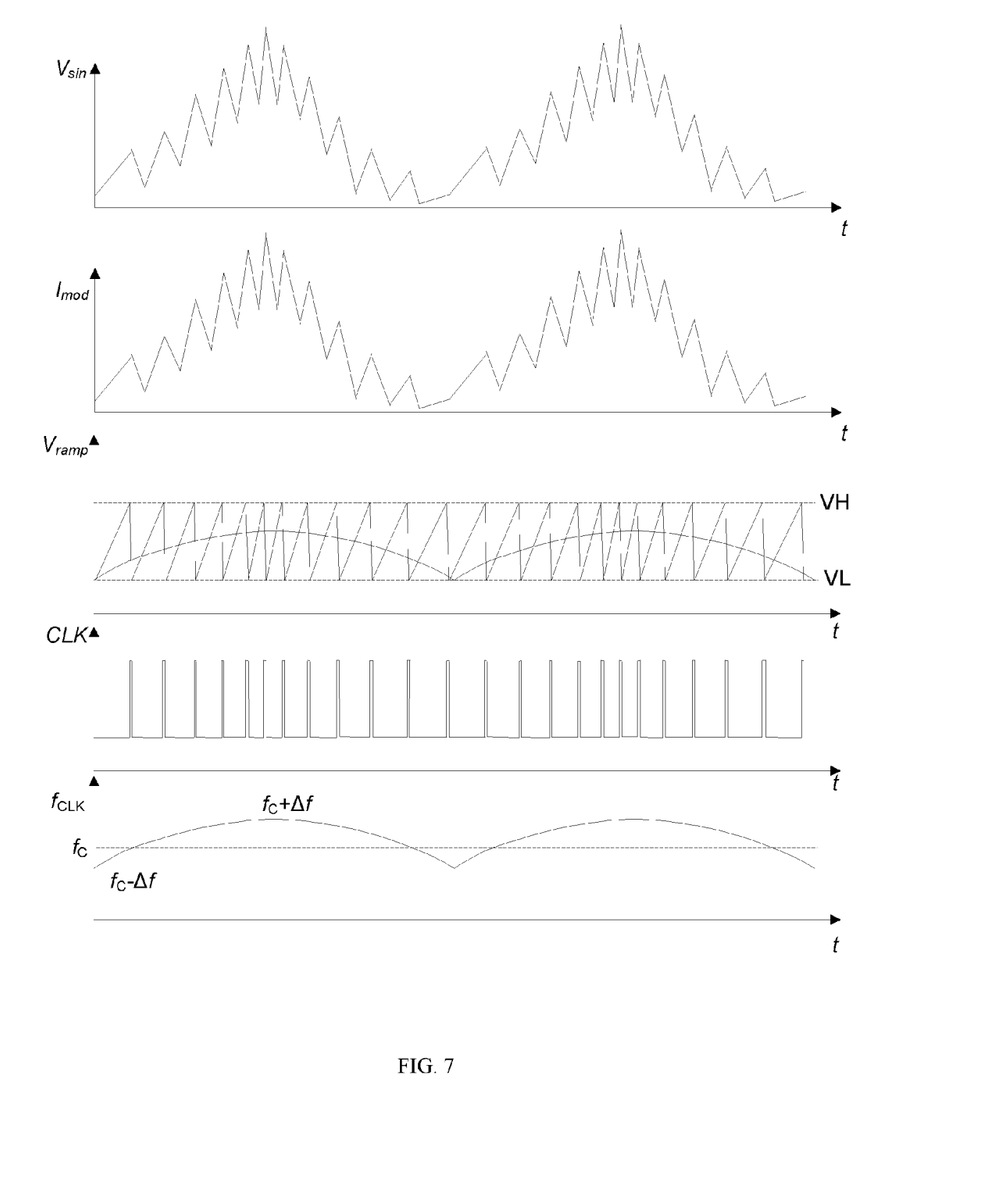
FIG. 7 is a waveform diagram showing an example operation of the mediate signal generator of FIG. 6, in accordance with embodiments of the present invention.

Second comparator 53 can be used to compare slope voltage signal $V_{ramp}$ against lower limit voltage reference $V_L$ to generate a reset signal. Here, example operational waveforms of upper limit voltage reference $V_H$, lower limit voltage reference $V_L$ and slope voltage signal $V_{ramp}$ are shown in FIG. 7, and the values of both upper limit voltage reference $V_H$ and lower limit voltage reference $V_L$ may be selected to meet common mode range requirements of first comparator 52 and second comparator 53.

First trigger 54 can be used to generate clock signal CLK with variable frequency based on the set signal and reset signal to control the frequency of slope voltage signal $V_{ramp}$. Although the second trigger may be selected as RS flip-flop 28 as described before, and the first trigger may be selected as RS flip-flop 54 in this example. However, one skilled in the art will recognize that particular embodiments are suitable for a variety of trigger types.

Second voltage-current converting circuit 51 of FIG. 6 can include second differential amplifier 511, with an inverting input terminal receiving sinusoidal half-wave voltage signal $V_{sin}$ and a non-inverting input terminal coupled to ground through fourth resistor $R_{51}$, to generate a second differential amplifying signal. Second current mirror circuit 512 can include fourth transistor $M_{51}$ and fifth transistor $M_{52}$ coupled as a cascade current mirror. The second differential amplifying signal may be employed as a gate driving signal for both fourth transistor $M_{51}$ and fifth transistor $M_{52}$. Sources of fourth transistor $M_{51}$ and fifth transistor $M_{52}$ can receive first reference voltage $V_{DD}$, and a drain of fourth transistor $M_{51}$ may be coupled to ground through fourth resistor $R_{51}$. A signal at a common node of fourth transistor $M_{51}$ and forth resistor $R_{51}$ can be coupled to the non-inverting input terminal of second differential amplifier 511. Also, the drain current of fifth transistor $M_{52}$ may be used as modulation current signal $I_{mod}$.

Slope voltage signal generator 55 can include first reference current source $I_{ref1}$, second capacitor $C_{51}$, first switch $K_{51}$, and second reference current source $I_{ref2}$. In this example, one terminal of first reference current source $L_{ref1}$ may be coupled to first reference voltage $V_{DD}$, and the other terminal may be coupled to a first terminal of second capacitor $C_{51}$. The second terminal of second capacitor $C_{51}$ can be coupled to ground. One terminal of first switch $K_{51}$ can be coupled to a first terminal of second reference current source $I_{ref2}$, and the other terminal of first switch $K_{51}$ can be coupled to a first terminal of second capacitor $C_{51}$. First switch $K_{51}$ may be controlled by clock signal CLK to control charging and discharging operations of second capacitor $C_{51}$.

The second terminal of second reference current source $I_{ref2}$ and the second terminal of second capacitor $C_{51}$ can be coupled to ground. Modulation current signal $I_{mod}$ and first reference current source $L_{ref1}$ can be used as charging current of second capacitor $C_{51}$, and second reference current source $I_{ref2}$ may be used as discharging current of second capacitor $C_{51}$. Clock signal CLK can control the switching operation of first switch $K_{51}$ to generate slope voltage signal $V_{ramp}$ with variable frequency at a common node of first reference current source $I_{ref1}$ and the first terminal of second capacitor $C_{51}$.

As shown in FIG. 7, at the beginning, second capacitor $C_{51}$ may be charged by first reference current source $I_{ref1}$ and modulation current signal $I_{mod}$ until the voltage of second capacitor $C_{51}$ reaches an upper limit reference voltage $V_H$. At this time, clock signal CLK may be converted to a high level by RS flip flop 54, and second capacitor $C_{51}$ starts to discharge as a result. By control of second reference current source $I_{ref2}$, second capacitor $C_{51}$ may be discharged rapidly to lower limit reference voltage $V_L$. By RS flip-flop 54, clock signal CLK may then be converted to a low level. Intervals for charging to upper limit reference voltage $V_H$ may be variable due to variable sinusoidal half-wave modulation current $I_{mod}$. The frequency of clock signal CLK can be calculated as indicated below in Equation 2.

$$f_{CLK} = \frac{I_{mod} + I_{ref1}}{(V_H - V_L) \cdot C_{51}} \quad (2)$$

Also, the core frequency can be calculated as indicated below in Equation 3.

$$f_{core} = \frac{\frac{1}{2}I_{mod\text{-}pk} + I_{ref1}}{(V_H - V_L) \cdot C_{51}} \quad (3)$$

The peak value of modulation current signal $I_{mod}$ may be represented as $I_{mod\text{-}pk}$. The frequency oscillation range can be represented as indicated below in Equation 4.

$$\Delta f = \frac{I_{mod}}{(V_H - V_L) \cdot C_{51}} \quad (4)$$

In this way, the frequency of clock signal CLK may be proportional to sinusoidal half-wave voltage signal $V_{sin}$, which is indicated as a sinusoidal half waveform.

Figure 8:
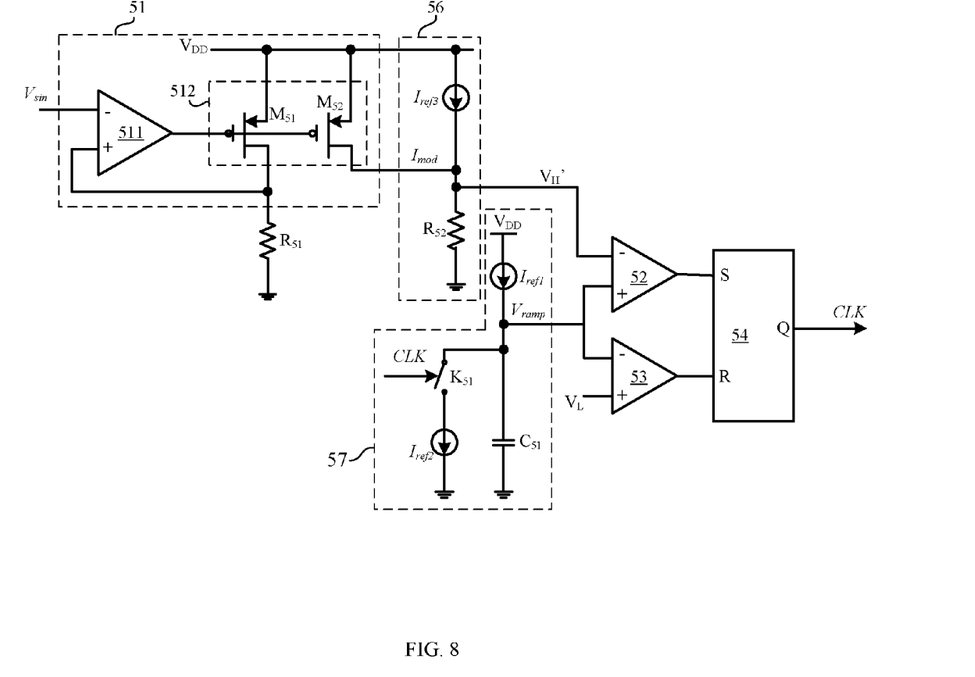
FIG. 8 is a schematic block diagram of a second example mediate signal generator in accordance with embodiments of the present invention.

Referring now to FIG. 8, another example mediate signal generator 25 in accordance with embodiments of the present invention is shown. This particular example includes many of the features and elements of the example shown in FIG. 6 and discussed above. In the example of FIG. 8, unstable upper limit reference voltage generator 56 can include third reference current source $I_{ref3}$ and fifth resistor $R_{52}$. The first terminal of third reference current source $I_{ref3}$ may be coupled to reference or supply voltage $V_{DD}$, and the second terminal $I_{ref3}$ may be coupled to the first terminal of fifth resistor $R_{52}$. The second terminal of fifth resistor $R_{52}$ can be coupled to ground. A common node of third reference current source $I_{ref3}$ and fifth resistor $R_{52}$ may receive modulation current signal $I_{mod}$. Both modulation current signal $I_{mod}$ and the current of third reference current source $I_{ref3}$ may flow through fifth resistor $R_{52}$ to generate unstable upper limit reference voltage $V_H'$ at the common node of fifth resistor $R_{52}$ and third reference current source $I_{ref3}$.

Slope voltage signal generator 57 can include first reference current source $I_{ref1}$, second capacitor $C_{51}$, first switch $K_{51}$, and second reference current source $I_{ref2}$. Here, one terminal of first reference current source $I_{ref1}$ may be coupled to first reference voltage $V_{DD}$, the other terminal of $I_{ref1}$ may be coupled to first terminal of second capacitor $C_{51}$, and the second terminal of second capacitor $C_{51}$ may be coupled to ground. First switch $K_{51}$ and second reference current source $I_{ref2}$ can be coupled in series between the common node of first reference current source $I_{ref1}$ and ground.

Current of first reference current source $I_{ref1}$ may be used as charging current of second capacitor $C_{51}$. Also, current of second reference current source $I_{ref2}$ can be employed as discharging current of second capacitor $C_{51}$. Clock signal CLK may be used to control the switching operation of first switch $K_{51}$ to generate slope voltage signal $V_{ramp}$ with variable frequency at the common node of first reference current source $I_{ref1}$ and first terminal of second capacitor $C_{51}$.

Figure 9:
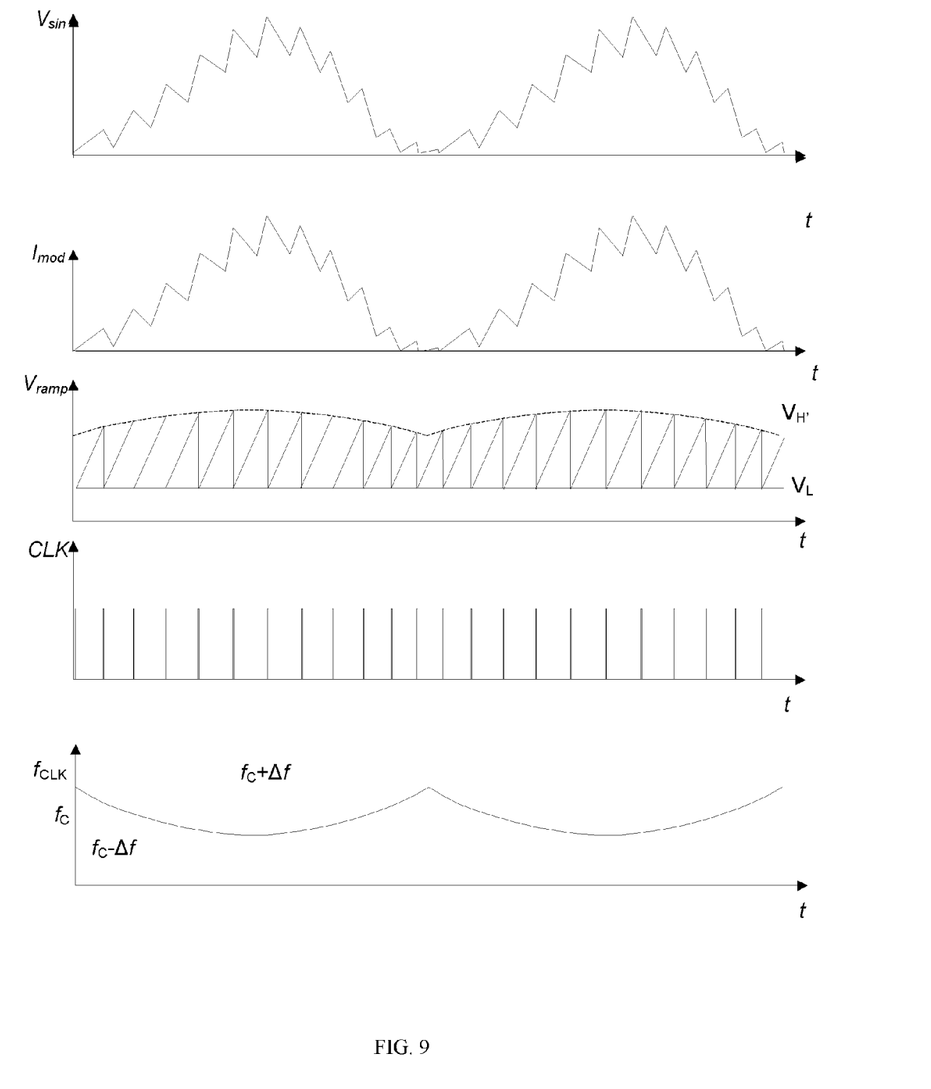
FIG. 9 is a waveform diagram showing an example operation of the mediate signal generator of FIG. 8, in accordance with another embodiment of the present invention.

Referring now to FIG. 9, shown is an example operation waveform of mediate signal generator 25, in accordance with embodiments of the present embodiment. At the beginning, second capacitor $C_{51}$ can be charged by the output current of first reference current source $I_{ref1}$ until the voltage of second capacitor $C_{51}$ reaches to upper limit reference voltage $V_H'$. Then, clock signal CLK can change to a high level by RS flip-flop 54 to make second capacitor $C_{51}$ begin to discharge. The second capacitor $C_{51}$ may discharge rapidly under operation of second reference current source $I_{ref2}$ until the voltage of second capacitor reaches lower limit reference voltage $V_L$. Then, clock signal CLK can change to low level by RS flip-flop 54. Here, the values of upper limit reference voltage $V_H'$ and lower limit reference voltage $V_L$ may be selected to satisfy the requirements of a common mode range of both first comparator 52 and second comparator 53.

For example, upper limit reference voltage $V_H'$ may be generated by third resistor $R_{52}$ based on modulation current signal $I_{mod}$ and third reference current source $I_{ref3}$. The value of upper limit reference voltage $V_H'$ of each charging and discharging cycle may be variable and indicated as a sinusoidal half waveform. The frequency of clock signal CLK can be calculated by the formula of Equation 5.

$$f_{CLK} = \frac{I_{ref1}}{[(I_{ref3} + I_{mod}) \cdot R_{52} - V_L] \cdot C_{51}} \quad (5)$$

Also, the core frequency can be represented as in Equation 6.

$$f_{core} = \frac{I_{ref1}}{\left[\left(I_{ref3} + \frac{1}{2}I_{mod\text{-}pk}\right) \cdot R_{52} - V_L\right] \cdot C_{51}} \quad (6)$$

The frequency oscillation range can be represented as shown below in Equation 7.

$$\Delta f = f_{max} - f_{min} = \quad (7)$$
$$\frac{I_{ref1}}{(I_{ref3} \cdot R_{52} - V_L) \cdot C_{51}} - \frac{I_{ref1}}{[(I_{ref3} + I_{mod\text{-}pk}) \cdot R_{52} - V_L] \cdot C_{51}}$$

The frequency oscillation range can be simplified as shown below in Equation 8.

$$\Delta f \approx \frac{I_{ref1} \cdot I_{mod\text{-}pk} \cdot R_{52}}{(I_{ref3} \cdot R_{52} - V_L)^2 \cdot C_{51}} \quad (8)$$

The input signal of reset terminal of RS flip-flop 28 may be clock signal CLK, so the frequency of controlling signal $V_{ctrl}$ outputted by output terminal is variable, which can control operation of power switch $M_{22}$. In this way, both jittering frequency and power factor correction functions can be achieved.

Figure 10:
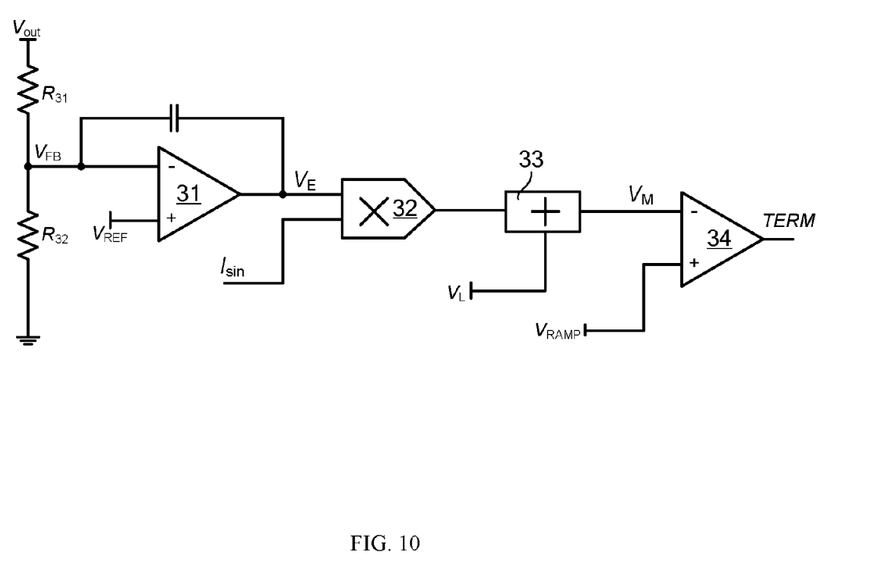
FIG. 10 is a schematic block diagram of a current modulation circuit in accordance with embodiments of the present invention.

With reference to FIG. 10, a schematic diagram of an example current modulation circuit 27 in accordance with embodiments of the present invention is shown. Output voltage $V_{out}$ of power stage 23 may be sampled by sampling circuit comprised by resistor $R_{31}$ and resistor $R_{32}$ that are coupled in series between output voltage $V_{out}$ and ground to generate voltage feedback signal $V_{FB}$ at a common node of both resistor $R_{31}$ and resistor $R_{32}$. Error signal $V_E$ indicating a difference between voltage feedback signal $V_{FB}$ and reference voltage $V_{ref}$ can be generated by error amplifier 31.

Sinusoidal half-wave current signal $I_{sin}$ may be multiplied with error signal $V_E$ by multiplier 32, the result of which sums with lower limit reference voltage $V_L$ by summer 33 to generate regulation signal $V_M = I_{sin} * V_E + V_L$ representative of both output voltage $V_{out}$ and input current (inductor current $I_L$). Modulation signal TERM can be generated by comparing regulation signal $V_M$ against slope voltage signal $V_{ramp}$ generated by mediate signal generator by comparator 34. Then, controlling signal $V_{ctrl}$ can be generated in response to modulation signal TERM and clock signal CLK by a logic and driving circuit to control the operation of power switch $M_{22}$, through which the charging and discharging of inductor $L_{21}$ may be controlled to maintain a substantially output voltage.

The power factor correction operation will be described as follows. Assuming that the on duty cycle of power switch $M_{22}$ is D, which can be represented as in the following Equation 9 in accordance with the relationship between slope voltage signal $V_{ramp}$, sinusoidal half-wave current signal $I_{sin}$ and error signal $V_E$, $$D = 1 - \frac{V_E \cdot I_{sin}}{V_{ramp}} \quad (9)$$

For a boost power stage, the output voltage $V_{out}$ can be represented as below in Equation 10.

$$V_{out} = \frac{V_{in}}{1-D} = k \cdot \frac{V_{in} \cdot V_{ramp}}{V_E \cdot I_{sin}} \quad (10)$$

Here, k is representative of a proportional coefficient of multiplier 32, and $V_{ramp}$ is representative of peak-to-peak value of slope voltage signal. Thus, input impedance $Z_{in}$ can be represented as below in Equation 11.

$$Z_{in} = \frac{V_{in}}{I_{sin}} = \frac{V_{out} \cdot V_E}{k \cdot V_{ramp}} \quad (11)$$

During a switching cycle of power switch $M_{22}$, values of output voltage $V_{out}$ and error signal $V_E$ are constant, and proportional coefficient k is constant. For embodiments that employ the mediate signal generator as shown in FIG. 6 in accordance with the present invention, a peak-to-peak value of the slope voltage signal can be substantially constant, so input impedance $Z_{in}$ can be substantially constant, and power factor correction performance can be achieved well.

For embodiments that employ the mediate signal generator as shown in FIG. 8 in accordance with the present invention, a peak-to-peak value of slope voltage signal can be unstable, but the amplitude of variation can be limited to a smaller range that can also achieve the power factor correction performance.

The foregoing descriptions of specific embodiments of the present invention have been presented through images and text for purpose of illustration and description of the power factor correction circuit. They are not intended to be exhaustive or to limit the invention to the precise forms disclosed, and obviously many modifications and variations are possible in light of the above teaching, such as alternatives of the example inductor current detection circuit and mediate signal generator discussed above with reference to FIGS. 6 and 8.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A power factor correction circuit, comprising:
   a) an inductor current detection circuit configured to detect inductor current flowing through an inductor to generate a sampling voltage signal, and to generate a sinusoidal half-wave current signal and a sinusoidal half-wave voltage signal based on said sampling voltage signal;
   b) a mediate signal generator configured to generate a slope voltage signal and a clock signal in response to said sinusoidal half-wave voltage signal, wherein a frequency of each of said slope voltage signal and said clock signal varies with said sinusoidal half-wave voltage signal;
   c) a current modulation circuit configured to receive said sinusoidal half-wave current signal and a voltage feedback signal representative of an output voltage of a power stage to generate a regulation signal, wherein said regulation signal is configured to be compared against said slope voltage signal to generate a modulation signal; and
   d) a logic and driving circuit configured to receive said modulation signal and said clock signal, and to generate a controlling signal therefrom, wherein said controlling signal is configured to control a power switch to operate with variable frequency to maintain said inductor current substantially in phase with said sinusoidal half-wave voltage signal and said output voltage of said power stage constant.

2. The power factor correction circuit of claim 1, wherein said inductor current detection circuit comprises:
   a) a sinusoidal half-wave current signal generator configured to convert said sampling voltage signal to said sinusoidal half-wave current signal; and
   b) a sinusoidal half-wave voltage signal generator configured to generate said sinusoidal half-wave voltage signal based on said sampling voltage signal.

3. The power factor correction circuit of claim 2, wherein said sinusoidal half-wave current signal generator comprises:
   a) a first differential amplifier having inverting and non-inverting input terminals, wherein said inverting input terminal is coupled to ground, and wherein said non-inverting input terminal is configured to receive said sampling voltage signal through a first resistor, and to generate a first differential amplifying signal; and
   b) a first current mirror circuit having a first transistor, a second transistor, and a third coupled in a cascade mode, wherein said first differential amplifying signal is configured as a gate driving signal for said first, second, and third transistors, wherein a drain of said first transistor is coupled to said non-inverting input terminal and a drain current of said third transistor is configured as said sinusoidal half-wave current signal.

4. The power factor correction circuit of claim 3, wherein said sinusoidal half-wave voltage signal generator comprises:
   a) a second resistor coupled between a drain of said second transistor and ground; and
   b) a third resistor coupled between a drain of said second transistor and a first terminal of a first capacitor that outputs said sinusoidal half-wave voltage signal, wherein a second terminal of said first capacitor is coupled to ground.

5. The power factor correction circuit of claim 1, wherein said mediate signal generator comprises:
   a) a second voltage-current converting circuit configured to convert said sinusoidal half-wave voltage signal to a modulation current signal;
   b) a slope voltage signal generator configured to generate said slope voltage signal with variable frequency in response to said modulation current signal;
   c) a first comparator configured to compare said slope voltage signal against an upper limit reference voltage, and to generate a set signal therefrom;
   d) a second comparator configured to compare said slope voltage signal against a lower limit reference voltage, and to generate a reset signal therefrom; and
   e) a first trigger configured to receive said set and reset signals, and to generate said clock signal with variable frequency to control a frequency of said slope voltage signal.

6. The power factor correction circuit of claim 5, wherein said second voltage-current converting circuit comprises:
   a) a second differential amplifier having second inverting and non-inverting input terminals, wherein said second inverting input terminal is configured to receive said sinusoidal half-wave voltage signal, and wherein said second non-inverting input terminal is coupled to ground through a fourth resistor to output a second differential amplifying signal; and
   b) a second current mirror circuit having a fourth transistor and a fifth transistor that are coupled in cascade mode, wherein said second differential amplifying signal is configured as a gate driving signal for each of said fourth and fifth transistors, wherein sources of each of said fourth and fifth transistors are coupled to a first reference voltage, wherein a drain of said fourth transistor is coupled to ground through said fourth resistor, wherein a common node signal of said drain of said fourth transistor and said third resistor is coupled to said second non-inverting input terminal, and wherein a drain current of said fifth transistor is configured as said modulation current signal.

7. The power factor correction circuit of claim 5, wherein said slope voltage signal generator comprises:
   a) a second capacitor having a first terminal coupled to a first reference current source and said second voltage-current converting circuit, said second capacitor having a second terminal coupled to ground;
   b) a first switch configured to be controlled by said clock signal;
   c) a second reference current source coupled in series with said first switch between said first terminal of said second capacitor and ground; and
   d) wherein said modulation current signal and said first reference current source are configured as a charging current of said second capacitor, and said second reference current source is configured as a discharging current of said second capacitor to generate said slope voltage signal at a common node of said first reference current source and second capacitor.

8. The power factor correction circuit of claim 5, wherein said slope voltage signal generator comprises:
   a) a first reference current source coupled to a first terminal of a second capacitor, wherein a second terminal of said second capacitor is coupled to ground;
   b) a first switch configured to be controlled by said clock signal, wherein said first switch and a second reference current source are coupled in series between said first terminal of said second capacitor and ground; and
   c) wherein said first reference current source is configured as a charging current of said second capacitor, and said second reference current source is configured as a discharging current of said second capacitor to generate said slope voltage signal at a common node of said first reference current source and said second capacitor.

9. The power factor correction circuit of claim 8, wherein said upper limit reference voltage is unstable, and wherein said mediate signal generator further comprises:
   a) an unstable upper limit reference voltage generator having a third reference current source coupled to a first terminal of a fifth resistor, wherein a second terminal of said fifth resistor is coupled to ground;
   b) wherein a common node of said third reference current source and said fifth resistor is configured to receive said modulation current signal and said third reference current source; and
   c) wherein a voltage of a common node of said third reference current source and said fifth resistor is configured as an unstable upper limit reference voltage signal coupled to said non-inverting input terminal of said first comparator.

10. The power factor correction circuit of claim 1, wherein said logic and driving circuit comprises:
   a) a second trigger configured to receive said modulation signal and said clock signal, and to generate a controlling signal therefrom; and
   b) a buffering circuit configured to control said operation of said power switch in accordance with said controlling signal.

11. An AC/DC power supply, comprising:
   a) the power factor correction circuit of claim 1;
   b) a rectifier circuit configured to generate a sinusoidal input voltage in response to a received AC voltage; and
   c) said power stage having said inductor, said power switch, a rectifier switch, and an output filtering circuit, wherein said power stage is configured to receive said sinusoidal input voltage, and to generate said output voltage.

* * * * *